United States Patent [19]
San Filipo

[11] 3,767,251
[45] Oct. 23, 1973

[54] WEED EXTRACTING DEVICE

[76] Inventor: Frank J. San Filipo, 120 Traymore Rd., Rochester, N.Y. 14609

[22] Filed: Apr. 6, 1972

[21] Appl. No.: 241,529

[52] U.S. Cl............... 294/50.8, 172/378, 294/50.6
[51] Int. Cl............................................. A01b 1/16
[58] Field of Search.................. 294/19 R, 49, 50.6, 294/50.8, 50.9, 53.5, 60, 61, 115; 111/95; 172/378; 254/132

[56] References Cited
UNITED STATES PATENTS

| | | | |
|---|---|---|---|
| 2,305,706 | 12/1942 | Henry............................ | 294/50.8 X |
| 1,082,547 | 12/1913 | Nuttall............................. | 294/50.9 |
| 1,885,377 | 11/1932 | Robinson....................... | 294/50.8 X |
| 3,463,244 | 8/1969 | McFaddan..................... | 294/50.9 X |
| 3,645,578 | 2/1972 | Renfroe........................... | 294/50.9 |
| 3,147,718 | 9/1964 | Steinberg....................... | 294/50.6 X |

Primary Examiner—Evon C. Blunk
Assistant Examiner—Johnny D. Cherry
Attorney—Steve W. Gremban

[57] ABSTRACT

A weed extracting device comprising a body member having a weed extracting member pivotally secured thereto and movable through an angle from an extended position, in which the extracting member is locked to the body member with its free end in substantial alignment therewith or offset at a small angle for insertion in the ground beneath a weed, to an extracting position, in which the extracting member is substantially at right angles to the body member, and extracts the weed from the ground.

4 Claims, 5 Drawing Figures

PATENTED OCT 23 1973
3,767,251
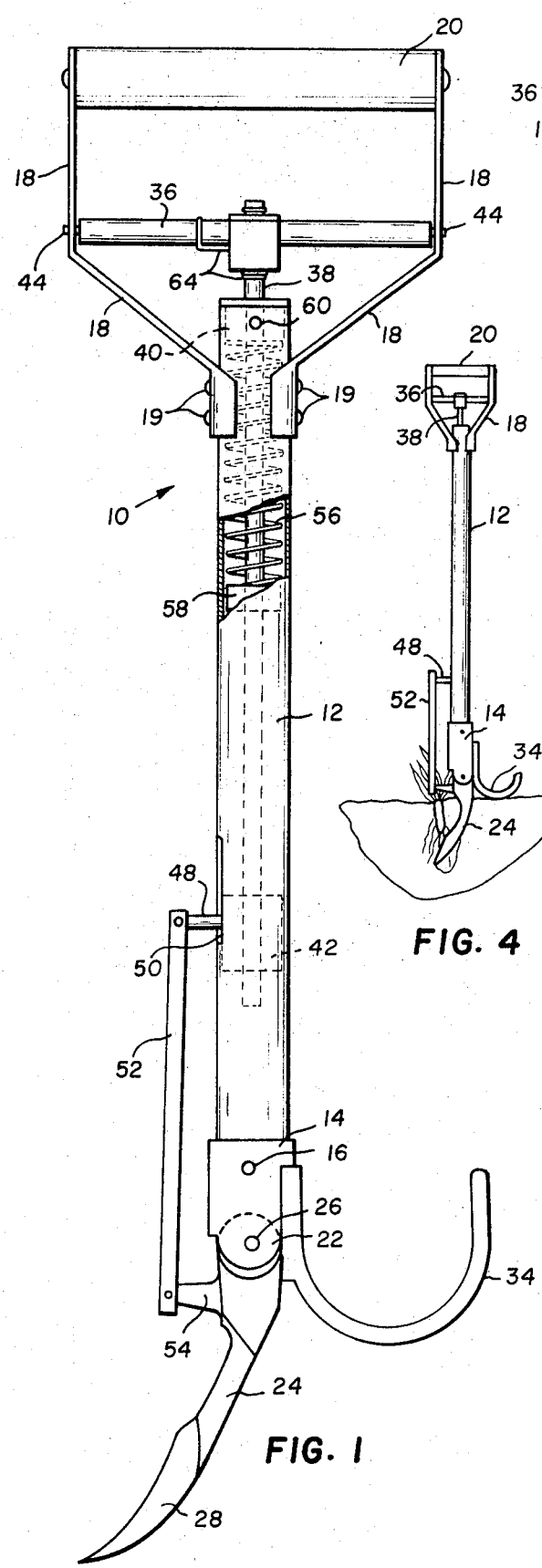
FIG. 1
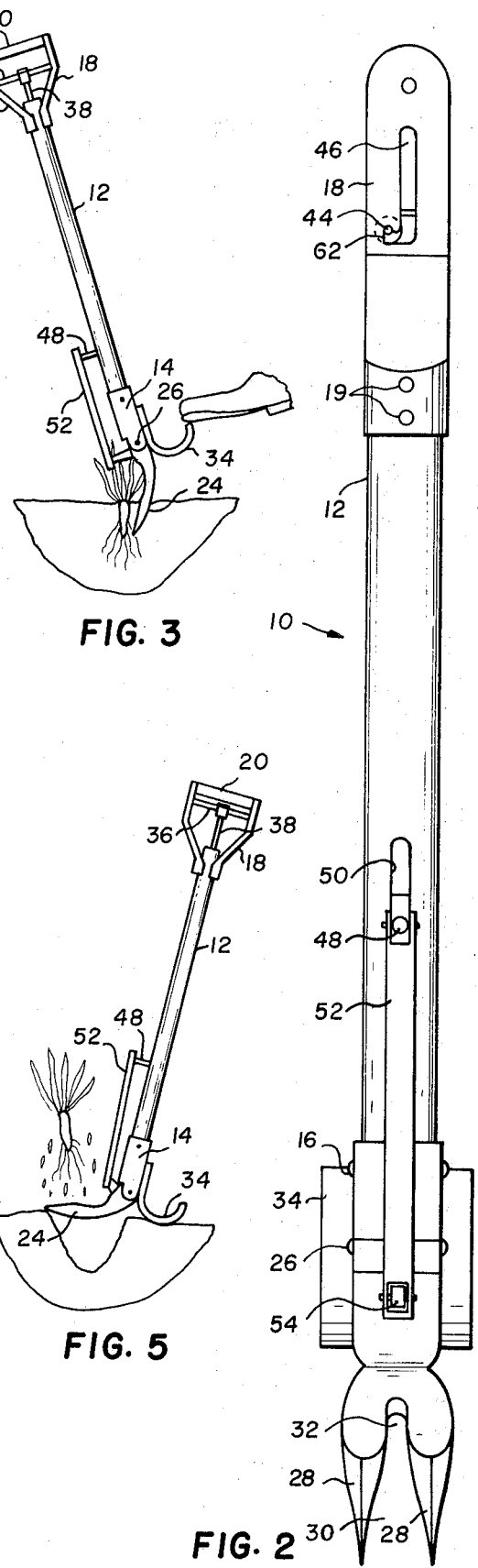
FIG. 3
FIG. 4
FIG. 5
FIG. 2

WEED EXTRACTING DEVICE

BACKGROUND OF THE INVENTION

1. Field of the Invention

This invention relates generally to garden implements, and more specifically to a weed extracting device.

2. Description of the Prior Art

It is known in the prior art to provide weed extracting devices in which the extracting portion at one end of the device is integral therewith. Although such a device operates satisfactorily, in order to extract a weed, it is necessary for the operator to pivotally move the device through a relatively large angle, requiring repetitive bending which is tiring to the operator. It is further known to provide a weed extracting device having a fulcrum about which the device may be pivoted, a weed extracting member at one end that may be moved beneath a weed to be extracted, and a pivotally movable holding member that may be moved into engagement with the weed for pressing the weed against the extracting member. The device is then pivotally moved about the fulcrum for extracting the weed. Although this device operates satisfactorily, it also suffers from the afore-mentioned disadvantage of requiring the operator to pivotally move the device through a large angle, which may be difficult to perform due to space limitations, and is further exceedingly tiring to the operator. In still another known type of weed extracting device, a reciprocally movable weed extracting member is moved relative to a supporting body member to a position below the weed for severing the root, the members locked together and manually moved upwardly for extracting the weed from the ground. The latter weed extracting device, although effective, is of complicated construction and costly to manufacture. These and other disadvantages of prior known weed extracting devices are overcome by applicant's invention.

SUMMARY OF THE INVENTION

This invention includes within its scope a weed extracting device having an elongated body portion, and a weed extracting member pivotally supported by the body portion. The weed extracting member is movable through an angle from an extended position, in which the extracting member is releasably latched to the body portion in substantial alignment therewith, or at a slight angle thereto, to an extracting position, in which the extracting member is substantially at right angles to the body portion for extracting a weed.

In one preferred embodiment of the invention, a tubular body member is provided having a handle secured to one end, and a weed extracting member pivotally mounted on the opposite end. The weed extracting member is movable between an extended position, in which it is at a slight angle to the tubular member, but substantially in alignment therewith, and a weed extracting position, in which it is substantially at right angles to the tubular member. The weed extracting member is movable through an angle of substantially 90° between its extended and extracting positions by a cross bar supported by the handle for reciprocal movement, and secured to the weed extracting member by a linkage. A latch mechanism is provided between the linkage and body portion for releasably locking the extracting member to the body portion with the extracting member in its extended position. In this locked position, the weed extracting member is rigid and may be inserted into the ground below a weed without any difficulty.

It is accordingly one of the objects of the present invention to provide an improved weed extracting device that is easy to operate without requiring any undue mechanical manipulation.

Another object of the invention is to provide an improved weed extracting device that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which:

FIG. 1 is a side elevational view of a preferred embodiment of the weed extracting device of this invention;

FIG. 2 is a front elevational view of the weed extracting device of FIG. 1;

FIG. 3 is a side elevational view of the weed extracting device showing the weed extracting member inserted into the ground below a weed;

FIG. 4 is a view similar to FIG. 3 showing the weed extracting device after it has been manually pivoted through a slight angle to loosen the weed; and FIG. 5 is a view similar to FIGS. 3 and 4 with the weed extracting member moved to its extracting position for extracting the weed from the ground.

DESCRIPTION OF THE PREFERRED EMBODIMENT

With reference to the drawings, the extracting device 10 of this invention comprises a tubular body member 12 having a support bracket 14 secured to one end by a pin 16, and a pair of spaced arms 18 secured to the opposite end by rivets 19 and between which a handle 20 is secured. The bracket 14 has a clevis 22 for pivotally supporting one end of a weed extracting member 24 by a pivot pin 26 extending through clevis 22 and member 24. The opposite end of extracting member 24 is forked, and the pointed tines 28 of the fork define a V-shaped notch 30 terminating in an elongated slot 32 for receiving the roots of a weed. The bracket 14 is provided with a laterally extending arcuate flange or foot pedal 34 by which extracting member 24 may be forced into the ground, the pedal further limiting the penetration of the extracting member into the ground and providing a pivot about which the tubular member 12 may be moved. The extracting member 24 is pivotally movable through any suitable angle, such as an angle of substantially 90° between an extended position, as seen in FIG. 1, in which the member 24 is at a slight angle to, but substantially in alignment with tubular member 12, and an extracting position, as shown in FIG. 5, in which member 24 is substantially perpendicular to tubular member 12. The mechanism for imparting such pivotal movement to extracting member 24 comprises a cross bar 36 rotatably mounted on one end of a shaft 38 which is mounted for slidable movement within tubular member 12 by an end cap bushing 40 and sleeve 42. The ends 44 of cross bar 36 extend through elongated, longitudinal slots 46 in arms 18. The shaft 38 is secured to extracting member 24 by a linkage comprising a laterally extending pin 48 secured by threads or the like to sleeve 42, and extending through an elongated slot 50 in tubular member 12. A bar 52 has one end pivotally secured to pin 48, and its opposite end pivotally secured to a laterally extending arm 54 on retracting member 24 offset from pivot pin 26. Accordingly, upward movement of cross bar 36 and shaft 38 results in pivotal movement of extracting member 24. The extracting member is held in its extended position by a spring 56 encircling shaft 38 and having one end bearing against a ring 58 secured to shaft 38, and its opposite end bearing against end cap bushing 40 secured by pin 60 to tubular member 12. The extracting member 24 is locked in its extended position by a latch for preventing movement of bar 36, shaft 38, and linkage 48,52 relative to tubular member 12. The latch comprises the ends 44 of bar 36 which are rotatably movable into laterally extending, transverse notches 62 at one end of slots 46. The bar ends 44 are prevented from upward movement by shoulders formed by notches 62, and are held in the latched position by a helical spring 64 having one end secured to shaft 38 by any suitable means, and the opposite end secured to bar 36.

In the operation of this invention, the latch 44,62 is normally in its latched position, releasably locking extracting member 24 in its extended position. As best seen in FIG. 3, the operator holds the extracting device 10 by handle 20, and pushes extracting member 24 beneath a weed until pedal 34 engages the ground surface. Such positioning of the device may be assisted by the operator's foot engaging foot pedal 34 and pressing downwardly. Once the extracting member 24 is inserted into the ground, the device 10 may be pivoted slightly through a small angle as best seen in FIG. 4 to loosen the roots of the weed and to position extracting member 24 so that the main root preferably enters slot 32. The operator twists cross bar 36 in a counterclockwise direction, removing bar ends 44 from notches 60 to release the latch. The cross bar 36 is pulled upwardly relative to the extracting device 10 which remains motionless, causing weed extracting member 24 to move through any suitable angle to its extracting position, removing the weed from the ground as best seen in FIG. 5. The angle through which member 24 is moved need only be large enough to accomplish the intended function of removing the weed from the ground.

The invention has been described in detail with particular reference to a preferred embodiment thereof, but it will be understood that variations and modifications can be effected within the spirit and scope of the invention as described hereinabove.

I claim:

1. In a weed extracting device, the combination comprising:

an elongated body member;

handle means at one end of said body member;

weed extracting means having an extracting portion thereof pivotally mounted at the other end of said body member and movable relative thereto between an extended position, in which said extracting portion is substantially in alignment with said body member, and an extracting position, in which said extracting portion is transverse to said body member;

a first spring for biasing said weed extracting portion to its extended position; and latch means between said extracting means and said body member for releasably latching the two together with said extracting portion of said weed extracting means in its extended position, said latch means comprising a shoulder on said body member and a projection movably mounted on said weed extracting means, and a second spring for biasing said projection into a position below and in alignment with said shoulder for preventing movement of said weed extracting portion from its extended position to its extracting position.

2. The invention according to claim 1 wherein said weed extracting means comprises means for coupling said extracting portion to said projection, said coupling means comprising a shaft slidably supported by said body member, and a linkage connecting said shaft to said extracting portion, said projection on said weed extracting means further being rotatably mounted on said shaft, and said second spring being interposed between said shaft and said projection.

3. The invention according to claim 1 wherein said body member is tubular, said handle means comprises a pair of spaced-apart arms secured to the end of said tubular body member and having a handle bar connected to the free ends of said arms, at least one of said arms further having an elongated slot substantially parallel to said tubular body member, said weed extracting means further comprising means for coupling said extracting portion to said projection, said coupling means comprising a shaft slidably mounted within said tubular body member, a linkage connecting said extracting portion to one end of said shaft, and said projection comprises a cross bar rotatably mounted on the opposite end of said shaft and interposed between said arms and having at least one end thereof extending into and slidably movable within said elongated slot in said one arm, and said shoulder is defined by a notch in said arm transverse to said slot.

4. The invention according to claim 3 wherein said second spring is interposed between said shaft and said cross bar for biasing said one end thereof into said notch.

* * * * *